(12) United States Patent
Tam

(10) Patent No.: US 6,608,423 B2
(45) Date of Patent: Aug. 19, 2003

(54) BRUSH HOLDER ASSEMBLY

(75) Inventor: Siu Chun Tam, Hong Kong (CN)

(73) Assignee: Johnson Electric, S.A., La Chaux-de-Fonds (CH)

( * ) Notice: Subject to any disclaimer, the term of this patent is extended or adjusted under 35 U.S.C. 154(b) by 80 days.

(21) Appl. No.: 09/780,344

(22) Filed: Feb. 12, 2001

(65) Prior Publication Data

US 2001/0013738 A1 Aug. 16, 2001

(30) Foreign Application Priority Data

Feb. 12, 2000 (GB) ............................................. 0003134

(51) Int. Cl.[7] .............................................. H02K 39/38
(52) U.S. Cl. ....................................... 310/239; 310/246
(58) Field of Search ................................. 310/239, 245, 310/246, 89, 43, 242, 251

(56) References Cited

U.S. PATENT DOCUMENTS

| 4,590,398 A | | 5/1986 | Nagamatsu |
| 4,855,631 A | | 8/1989 | Sato et al. |
| 4,963,779 A | * | 10/1990 | Lentino et al. ............. 310/180 |
| 4,983,872 A | * | 1/1991 | Strobl ........................ 310/239 |
| 5,148,073 A | * | 9/1992 | Tamura ...................... 310/239 |
| 5,315,199 A | | 5/1994 | McCracken et al. |
| 6,097,128 A | * | 8/2000 | Ko ............................. 310/239 |

FOREIGN PATENT DOCUMENTS

| DE | 197 12 194 A1 | 9/1998 |
| GB | 1516909 | 7/1978 |
| GB | 2 224 166 A | 4/1990 |

OTHER PUBLICATIONS

Patent Abstracts of Japan, vol. 017, No. 121 (E–1331), Mar. 12, 1993, and JP 04 299043 A, Oct. 22, 1992.

* cited by examiner

Primary Examiner—Thanh Lam
(74) Attorney, Agent, or Firm—Birch, Stewart, Kolasch & Birch, LLP

(57) ABSTRACT

A universal motor has a brush holder assembly which is fixed to a support bracket using a single fastener. The brush holder assembly uses a terminal cap to secure the brush and brush spring within the brush holder. The terminal cap is fixed to the brush holder and compresses the brush spring by movement of the terminal cap in a single direction.

10 Claims, 3 Drawing Sheets

BRUSH HOLDER ASSEMBLY

FIELD OF THE INVENTION

This invention relates to electric motors and in particular, to a brush cage assembly for use with a fractional horsepower electric motor.

BACKGROUND OF THE INVENTION

Previously, plastic brush cages have been used for guiding brushes to the commutator of an electric motor. Typically, these brush cages are mounted in apertures in a metal bracket which also supports a bearing for the motor shaft. These cages are usually held in place by two rivets passing through holes in the brush cage and in the bracket. The cost of the rivets and time taken to set the rivets adds to the overall cost of the motor. Alternative schemes have used glue to fasten the brush cage in place but the cost of the glue which must resist aging under extreme temperatures and vibration conditions means that this method is not a significant cost reduction.

Another problem facing users of brush cage assemblies is how to retain the brush within the brush cage and make a good electrical connection between the brush and the supply lead. For high current applications, it is necessary to provide brushes with shunts but for low current applications, the brush spring is often used for the electrical contact with the brush with the cap for the brush cage acting as a terminal plate connecting the supply lead to the brush spring. However, prior art designs usually involve deforming the cap or brush cage insert or a lateral movement of the cap to close the brush cage and capture the brush spring within the brush holder. As the spring bears against the terminal plate or cap, the cap must be securely fastened to the brush holder. However, as the spring is being compressed as the lateral movement or deforming process takes place, there is a real danger of damage being caused to the spring. Hence, there is also a need for a simple yet effective conductive closure for a brush holder for shuntless brushes.

SUMMARY OF THE INVENTION

The present invention, in one aspect thereof, provides a cost reduction by halving the number of rivets used to fasten the brush cage to the bracket. This is achieved by using a brush holder which has a projection arranged to bear against an inner surface of the support bracket and is arranged to be secured to the bracket by a single fastener.

Accordingly, the present invention provides a brush holder assembly, for use in a fractional horsepower universal motor, the assembly comprising: a brush holder having a through hole for slidably receiving a carbon brush and a brush spring; a terminal for connecting the brush to a supply lead; a cap for closing one end of the through hole thereby capturing the brush spring within the brush holder between the cap and the brush, wherein the brush holder has a flange for bearing against an outer surface of a support bracket and the brush holder has a projection arranged to bear against an inner surface of the support bracket and is arranged to be secured to the bracket by a single fastener.

Preferably, the support bracket has an aperture sized to receive the brush holder and the brush holder is fitted to the bracket by inserting the brush holder through the aperture in the bracket in a first direction so that the flange bears against the outer surface of the bracket and then moving the brush holder in a second direction orthogonal to the first direction so that the projection bears against the inner surface of the bracket.

Preferably, the brush holder has two passageways extending in the same direction as the brush through hole, each having a step therein and the cap has two arms, each having a lanced and raised portion, the arms extending along the passageways with the raised portions engaging the steps preventing the withdrawal of the arms from the passageways.

By these additional features, the closure member which may also be the terminal plate, is fastened to the brush holder by a simple axial movement which compresses the brush spring at the same time. Thus the brush spring is compressed and the terminal plate is fixed to the brush holder by a single axial movement.

These and other features and advantages of this invention will become apparent from the following description of preferred embodiments of the invention, offered as an example only.

DETAILED DESCRIPTION OF THE PREFERRED EMBODIMENTS

Figure 1:
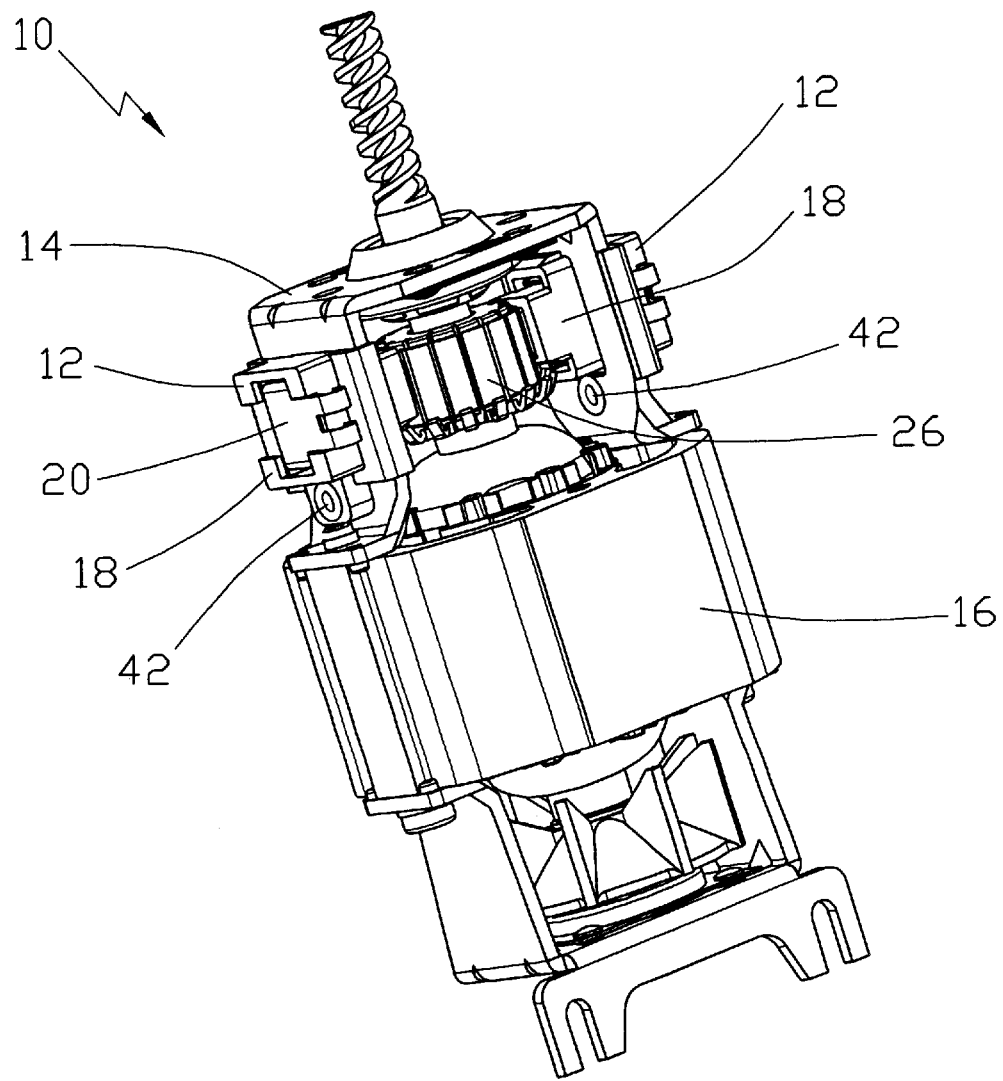
FIG. 1 depicts a universal motor incorporating a brush holder assembly according to the present invention.

FIG. 1 illustrates a fractional horsepower universal motor 10 which has a pair of brush holder assemblies 12 mounted on a support bracket 14 fixed to one end of a stator core 16. As the brush holder assemblies are identical, only one will be described. It should be noted that the windings and electrical connections have been omitted to more clearly show the other parts of the motor.

Figure 2:
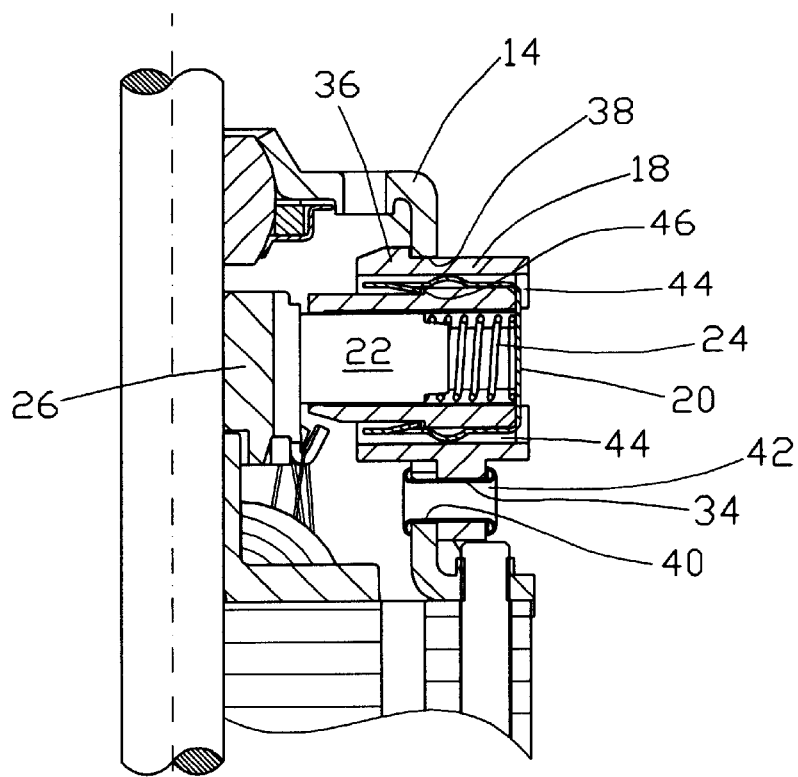
FIG. 2 is an enlarged sectional view of a part of the motor of FIG. 1 illustrating how the brush holder assembly is fitted.

FIG. 2 is an enlarged sectional view of a portion of the motor 10 of FIG. 1 showing one brush holder assembly 12 and illustrating the connection between the bracket 14 and the brush holder assembly 12.

The brush holder assembly 12 comprises two parts, a brush holder 18 and a terminal plate or cap 20 which is fitted to the brush holder 18. The brush holder assembly is combined with a carbon brush 22 and a brush spring 24 to complete the brush assembly for the motor.

Figure 3:
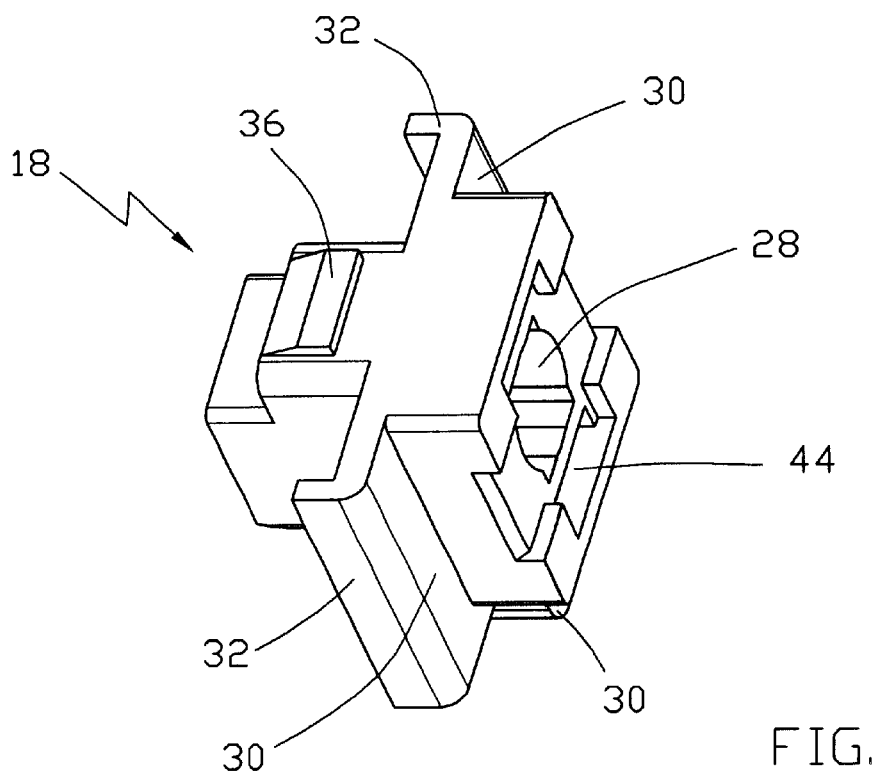
FIG. 3 illustrates a brush holder being a part of the brush holder assembly of FIG. 2.

The brush holder 18, which is shown in FIG. 3, is a molded body of plastics material, preferably phenolic and has a through hole 28 for slidably receiving the carbon brush 22. The body has a laterally extending flange 30 with two upturned edges 32. The flange 30 rests against the bracket 14 with the upturned edges 32 partially wrapping around corresponding edges of the bracket. The flange 30 has a hole 34 through a lower portion for receiving a rivet 42 or similar fastening device. A step-like projection 36 is formed on the upper surface of the brush holder 18.

During assembly, the brush holder 18 is inserted through an aperture 38 in the bracket 14. The aperture 38 is sized and shaped to neatly receive the brush holder 18 with the exception that the vertical dimension is slightly enlarged to enable the step-like projection 36 to pass through the aperture 38. Then, once the flange 30 rests against an outer surface of the bracket 14, the brush holder 18 is moved upwardly so that the step-like projection 36 contacts an inner surface of the support bracket 14 resisting withdrawal of the brush holder 18 from the aperture 38. Moving the brush holder 18 upwards also aligns the hole 34 in the flange 30 with a hole 40 in the bracket 14 and once a rivet 42 or other fastening device is applied through the two holes 34, 40, the brush holder 18 is locked in position.

The brush holder 18 has two passageways 44 which extend parallel to the brush through hole 28. These passageways 44 have an internal step 46, the purpose of which will be described shortly.

Figure 4:
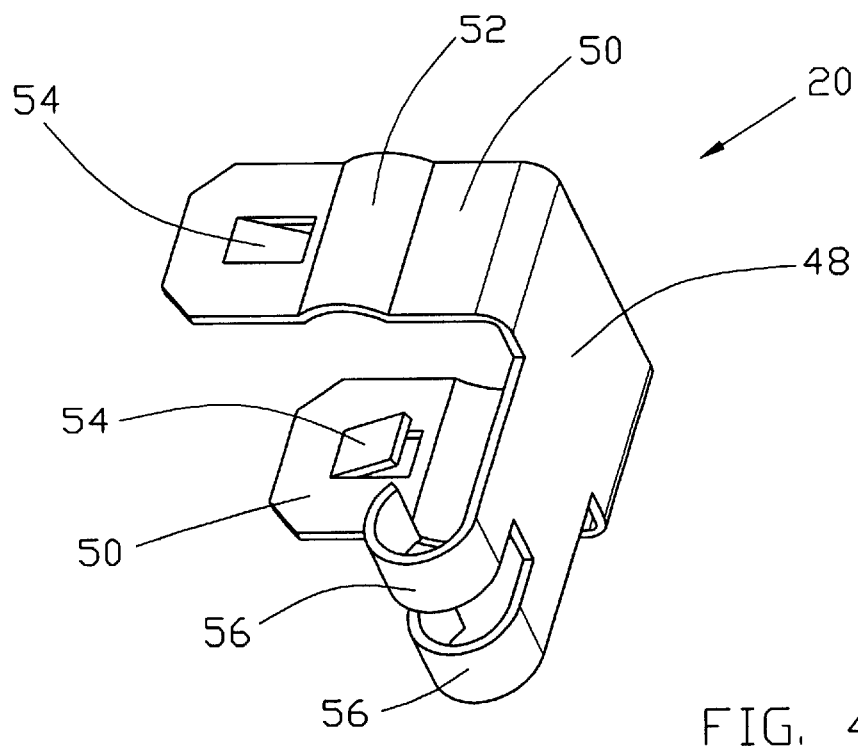
FIG. 4 illustrates a terminal cap being a part of the brush holder assembly of FIG. 2.

The terminal cap 20 is illustrated more clearly in FIG. 4. It is a conductive part formed from sheet brass or copper, preferably beryllium copper, and having a flat central portion 48 from which extends two arms 50. Each arm 50 has a rounded deformation 52 midway along and a raised or pressed out finger 54 adjacent the distal end.

The terminal portion of the terminal cap comprises two terminal legs 56 also extending from the central portion 48. The terminal legs 56 form loops in which a lead wire is placed and then the loops are crimped or compressed to grip the wire. The lead wire is usually a plastic coated multistrand cable and the insulation is removed from the end and the bared end is placed in one of the loops to make the electrical connection while the other loop receives an insulated portion of the lead wire adjacent the bared end to provide stress relief for the electrical connection. Alternatively, the bared end of the wire may be soldered to the terminal leg 56.

In assembling the brush assembly, a brush 22 is placed in the brush through hole 28 and the spring 24 is then pressed against the outer end of the brush 22. The terminal cap 20 is then pressed against the spring 24 and the arms 50 of the terminal cap are inserted into the two passageways 44 of the brush holder and pressed home so that the terminal cap 20 abuts and closes the brush through hole 28. In the closed position, the fingers 54 snap out behind the steps 46 in the passageways 44 to prevent the terminal cap 20 from being removed from the brush holder 18, thus capturing the spring 24 and the brush 22 within the brush holder 18. The spring 24, being compressed between the terminal cap 20 and the brush 22, presses the brush 22 against the commutator 26. The rounded deformations 52 in the arms 50 of the terminal cap act as springs within the passageways 44 removing any looseness in the fitting. Thus the terminal cap compresses the spring and is secured to the brush holder by movement in a single direction preventing damage or distortion of the spring caused by lateral movement during assembly.

Figure 5:
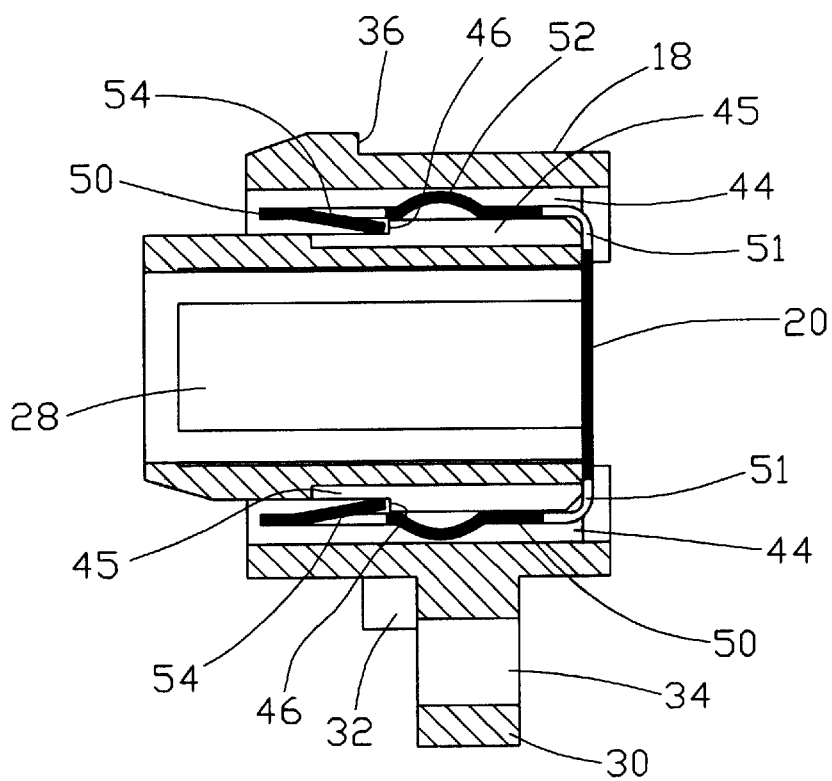
FIG. 5 is a sectional view of a brush holder assembly according to a second embodiment of the invention.

FIG. 5 is a sectional view of a brush holder assembly according to a second embodiment. This embodiment is essentially the same as the first embodiment and corresponding parts are similarly numbered. In this embodiment, a groove 45 is formed along one side of each of the two passageways 44 and extends through the internal step 46. A hole 51 is formed in the terminal cap 22 in alignment with each groove 45. The holes 51 provide access to the grooves 45 for a release pin to resiliently deform or press back the pressed out fingers 54, thereby releasing the fingers 54 from the steps 46 and allowing the cap 20 to be removed. This is desirable in applications where there is access to the brush assemblies so that the brushes an be changed or replaced.

Various modifications to the described embodiments will be apparent to those skilled in the art and it is desired to include all such modifications as fall within the scope of the accompanying claims.

What is claimed is:

1. A brush holder assembly, for use in a fractional horsepower universal motor, comprising:

a brush holder having a through hole for slidably receiving a carbon brush and a brush spring, a terminal for connecting the brush to a supply lead, a cap for closing one end of the through hole thereby capturing the brush spring within the brush holder between the cap and the brush, wherein the brush holder has a flange for bearing against an outer surface of a support bracket, and the brush holder has a projection extending transversely to a direction of said through hole arranged to bear against an inner surface of the support bracket opposite said outer surface and is arranged to be secured to the bracket by a single fastener.

2. The brush holder assembly of claim 1 wherein the single fastener is a rivet.

3. The brush holder assembly of claim 1 wherein the single fastener passes through a hole in the brush holder which is aligned with a hole in the support bracket when the projection is seated against the bracket.

4. The brush holder assembly of claim 1, wherein the support bracket has an aperture larger than the brush holder for receiving the brush holder in a first direction so that the flange bears against the outer surface of the bracket, while leaving space between the support bracket and the brush holder in a second direction orthogonal to the first direction so that the brush holder is transversely movable allowing the projection to bear against the inner surface of the bracket.

5. The brush holder assembly of claim 1, wherein the brush holder has two passageways extending in the same direction as the brush through hole, each having a step therein and the cap has two arms, each having a raised finger, the arms extending along the passageways with the raised fingers engaging the steps preventing the withdrawal of the arms from the passageways.

6. The brush holder assembly of claim 5 wherein each of the two arms has a rounded deformation at a location along its length, the deformation being resiliently compressed by the passageway.

7. The brush holder assembly of claim 5, wherein the terminal is integral with the cap and has a pair of curled legs for connecting the supply lead.

8. The brush holder assembly of claim 5, wherein the cap is formed from beryllium copper.

9. The brush holder assembly of claim 5, wherein the cap is brass.

10. The brush holder assembly of claim 5 wherein each passageway has a groove passing through the step providing access for releasing the finger from the step to remove the cap.

* * * * *